United States Patent [19]
Eustance

[11] 3,724,043
[45] Apr. 3, 1973

[54] METHOD OF MAKING A CAPACITOR WITH A PREIMPREGNATED DIELECTRIC

[75] Inventor: John W. Eustance, South Glens Falls, N.Y.

[73] Assignee: General Electric Company, New York, N.Y.

[22] Filed: May 13, 1971

[21] Appl. No.: 143,155

Related U.S. Application Data

[63] Continuation of Ser. No. 861,609, Sept. 29, 1969, abandoned.

[52] U.S. Cl.............29/25.42, 117/138.8 E, 252/66, 317/258
[51] Int. Cl............................................H01g 13/04
[58] Field of Search .....317/258, 259, 260; 29/25.42; 252/66; 174/25

[56] References Cited

UNITED STATES PATENTS

| | | | |
|---|---|---|---|
| 3,363,156 | 1/1968 | Cox | 317/258 |
| 3,424,957 | 1/1969 | Katchman | 317/259 |
| 3,430,116 | 2/1969 | Johnstone | 317/258 |
| 3,440,212 | 4/1969 | Tholstrop | 252/66 |
| 3,445,394 | 5/1969 | Hunt | 252/66 |

FOREIGN PATENTS OR APPLICATIONS

| | | | |
|---|---|---|---|
| 106,535 | 2/1939 | Australia | 317/260 |
| 1,045,527 | 10/1966 | Great Britain | 174/25 |

OTHER PUBLICATIONS

Birks; F. B., Modern Dielectric Material Heywood & Co., London, 1960, pp. 140–141

Primary Examiner—E. A. Goldberg
Attorney—James J. Lichiello, Nathan J. Cornfeld, Frank L. Neuhauser, Oscar B. Waddell and Joseph B. Forman

[57] ABSTRACT

A liquid dielectric capacitor impregnant such as a halogenated aromatic hydrocarbon, castor oil, or mineral oil is added to finely divided polypropylene resin and thoroughly mixed therein. The resulting composition is then passed through a high temperature apparatus to produce capacitor grade polypropylene film. This film may contain the impregnant in significant amounts up to and exceeding about 20 percent by weight. An epoxide stabilizer material may also be preincorporated in the resin or added to the liquid impregnant. After a capacitor has been made with the preincorporated impregnant, the capacitor is impregnated to increase the amount of liquid dielectric therein.

13 Claims, 4 Drawing Figures

PATENTED APR 3 1973

3,724,043

INVENTOR:
JOHN W. EUSTANCE,

BY *James J. Lichiello*

HIS ATTORNEY.

THE METHOD OF MAKING A CAPACITOR WITH A PREIMPREGNATED DIELECTRIC

This application is a continuation of Ser. No. 861,609 filed Sept. 29, 1969 now abandoned.

BACKGROUND OF THE INVENTION

This invention relates to epoxide stabilized polypropylene film and more particularly to capacitor grade polypropylene film produced from a composition of intermixed liquid chlorinated diphenyl and finely divided polypropylene resin.

Polypropylene film as a capacitor dielectric has become a prominent and outstanding dielectric for liquid impregnated power capacitors. In U. S. Pat. No. 3,363,156, Cox, assigned to the same assignee as the present invention, there are disclosed numerous capacitor embodiments employing the combination of polypropylene film and chlorinated diphenyl liquid impregnant. The teachings of this patent are incorporated by reference in the present application.

The noted Cox patent describes a kind of impregnation of polypropylene film as "essentially complete impregantion" whereby the liquid impregnant passes through or permeates the molecular structure of the polypropylene film. In a capacitor roll section which is wound from a composite of alternate foil and film strips, the kind of impregnation referred to is most important because the impregnant must proceed from the roll edge into the center parts of the roll. Polypropylene films tend to cling tightly to each other and to electrode foils so that it is extremely difficult to provide essentially complete impregnation of all voids, interstices and spaces within the roll as well as within the materials. In order to more expeditiously provide essentially complete impregnation, it has been the practice to utilize paper strips adjacent the film strips in a roll so that the paper may act as wicking to pass the impregnant to the center parts of the roll. Even with wicking, the impregnant usually must be passed transversely through the film to reach interior voids and spaces as well as those on the opposite side of the film. This is particularly applicable when a polypropylene film is positioned adjacent to and in contact with a foil strip. In this arrangement the liquid impregnant must pass transversely through the film to the spaces between the film and foil.

Consequently, in order to provide essentially complete impregnation uniformly throughout the roll, it is taught that polypropylene and chlorinated diphenyl must be brought together under the adverse condition of high temperature, and retained there for a sufficient period of time for essentially complete impregnation to occur. Under this condition the thin polypropylene film may dissolve extensively or be otherwise degraded by the impregnant. Impregnation times and temperatures, and the use of paper wicking must be carefully regulated in order to provide essentially complete impregnation and preserve the integrity of the materials. Any unimpregnated areas are sources of deleterious corona discharge even though they may later become impregnated by aging. Some areas become effectively blocked from being impregnated for a considerable period of time because of material nonuniformities, the presence of other materials, and other environmental causes.

Many other impregnation aids have been disclosed, such as roughening of film surfaces and the inclusion of wetting agents in the impregnant. However, these and other aids are less efficient because they still depend on the impregnant reaching the distant trouble areas from remote roll edge locations. It has now been discovered that by preincorporating some impregnant uniformly in the film material, the trouble areas may be partially or fully preimpregnated, or an impregnant path or penetrating environment is provided to facilitate the passage of impregnant into the roll.

SUMMARY OF THE INVENTION

It is an object of this invention to provide capacitor grade polypropylene film from a mixture comprising finely divided polypropylene resin and chlorinated diphenyl liquid.

It is another object of this invention to provide partial preimpregnated polypropylene film for capacitor dielectric usage.

It is still another object of this invention to provide a fully preimpregnated polypropylene film for a capacitor.

It is another object of this invention to reduce the time and temperature requirements of essentially complete impregnation for polypropylene film capacitors.

It is a further object of this invention to provide more uniform impregnation of polypropylene film for capacitor usage.

It is another object of this invention to provide an all-film capacitor having no wicking therein and wherein the film is preimpregnated to serve as its own wicking.

This invention in one of its preferred forms includes the production of capacitor grade polypropylene film from a mixture comprising finely divided polypropylene resin and a liquid chlorinated hydrocarbon. This film having preincorporated therein from about 5.0 percent to about 20 percent by weight impregnant is utilized as dielectric material for a capacitor, and may or may not undergo further impregnation.

DESCRIPTION OF THE DRAWINGS

This invention will be further understood when taken in connection with the following specification, and the drawings in which.

DESCRIPTION OF THE PREFERRED EMBODIMENTS

Figure 1:
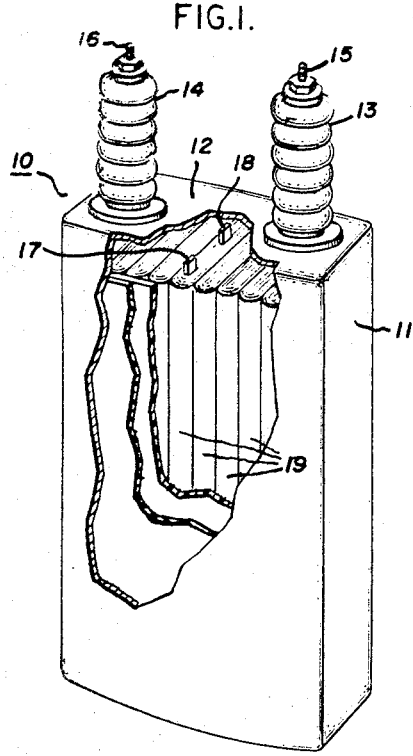
FIG. 1 is a high voltage AC power capacitor including a plurality of capacitor roll sections.

A primary kind of capacitor to which this invention is directed is illustrated in FIG. 1. In FIG. 1 capacitor 10 may be denoted as a high voltage AC power capacitor and more particularly a power factor correction capacitor. Capacitor 10 includes an appropriate casing member 11 with a cover 12 sealed thereto. Capacitor 12 is provided with insulating bushing members 13 and 14 which insulate terminals 15 and 16 from cover 12. Terminals 15 and 16 provide an electrical connection (not shown) to tap straps 17 and 18 of the roll sections 19 in the casing 11. Roll sections 19 are more fully described with respect to FIG. 2.

Figure 2:
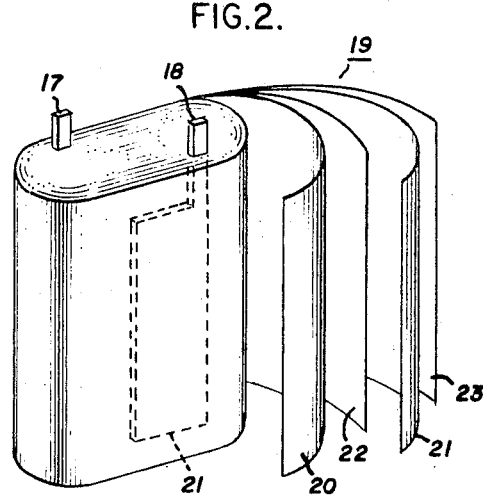
FIG. 2 is a convolute or roll section, for a capacitor, which comprises alternate foil and preimpregnated polypropylene film strips.

Referring now to FIG. 2, there is illustrated a common example of a convolute or roll section 19 for use in an impregnated type capacitor. A roll section 19 usually comprises alternate strips, 20 and 21, of a metal foil and dielectric, 22 and 23. In a preferred practice of this invention, strips 22 and 23 are polypropylene film of usually less than 0.001 inch thickness and foil strips 20 and 21 are of aluminum. Placed adjacent the foil strips at appropriate locations in the roll are tap straps 17 and 18 which are utilized as electrical connections for the electrode foil strips, and are suitably connected to terminals 15 and 16. The noted strips are fairly tightly wound in circular form and then flattened to the illustrated configuration.

Impregnation of the capacitor 10 usually takes place by means of one or more small holes in cover 12 which thereafter are solder sealed. During impregnation the capacitor 10 is generally submerged in a liquid impregnant which fills casing 11 and impregnates the roll sections 19 therein. Certain pre-evacuation cycles, high temperatures and other process steps are also usually employed.

One of the major processing disadvantages present in impregnated capacitors, particularly roll section capacitors, is the difficulty of obtaining complete impregnation. In order to provide, for example, a high voltage, above about 600 volts, AC power factor correction capacitor, complete impregnation should include a filling of air spaces or voids between the electrodes, whether these voids and interstices are between adjacent dielectric strips, between dielectric strips and electrode strips, or within the dielectric materials.

In a wound roll section such as illustrated in FIGS. 1 and 2, the impregnant must proceed axially through the roll to reach the innermost portions. If the dielectric material is porous, or will otherwise absorb and transmit or pass the impregnant under the conditions of impregnation, then the impregnant not only may pass rapidly axially through the roll, but also may pass transversely through adjacent dielectric strips. Some dielectric materials, such as the well-known capacitor paper dielectrics, pass most impregnants with such facility that no complex impregnation process is required. Other dielectric materials may be made porous or otherwise modified to facilitate absorption and the passing of impregnants therethrough.

The advent of certain resin materials for capacitor dielectrics, for example, the polyolefins, polycarbonates and polyethylene terephthalate, increased the complexities of impregnation because these materials were considered generally impervious to the desired impregnants, or were incompatible therewith for solubility, integrity, and other reasons. Where the resin and the impregnant were otherwise compatible, certain sandwich type or wicking structures were employed. In U. S. Pat. No. 2,864,982, Ruscetta, assigned to the same assignee as the present invention, a sheet of paper is employed on each side of a polyethylene terephthalate sheet. Upon impregnation the paper absorbs the impregnant in wick-like fashion and transmits the impregnant rapidly axially through the capacitor roll section into the spaces between the resin film and the foil.

In the noted Cox patent, there is disclosed that, under proper conditions, a polyolefin resin such as polypropylene can be made to compatibly absorb and pass an impregnant such as chlorinated diphenyl so that a roll section comprising polypropylene is essentially completely impregnated. Impregnation of this kind is aided by the use of paper wicking adjacent the polypropylene which reduces impregnation temperature and time. Although paper facilitates impregnation, critically unimpregnated areas are still found. Further, the presence of paper in the kind of capacitor described is a limitation on the capacitor with respect to minimal size, maximum stress capabilities and maximum corona start voltages, as well as on the available positions for the paper. Additionally, the presence of paper complicates the impregnation cycle or process by requiring a significant water vapor extraction process preceding impregnation, because the paper contains a considerable amount of absorbed water.

It has been unexpectedly discovered that a halogenated hydrocarbon such as a chlorinated diphenyl can be added to a polyolefin resin such as polypropylene in such a manner that film produced from the resin includes a desirable amount of trichlorodiphenyl uniformly therein. For example, polypropylene films may be produced from impregnated resin having trichlorodiphenyl preincorporated therein in various amounts up to and exceeding 20 percent by weight. This preincorporation of trichlorodiphenyl provides a number of important advantages. Among these advantages are: first, that the preincorporation provides a more uniform impregnation; second, that the final capacitor assembly may need no further impregnation; third, that the presence of trichlorodiphenyl in the film makes the film highly receptive to additional liquid impregnation; and fourth, that paper wicking may be minimized or eliminated.

A general method of providing the impregnated film of this invention is to add the desired quantity of trichlorodiphenyl, preferably in liquid form, directly to a given amount of polypropylene resin. Thereafter, suitable agitation provides the intermixture of the materials. Other methods of exposing polypropylene resin to liquid trichlorodiphenyl may be employed such as spray coating the resin or adding the trichlorodiphenyl to the resin producing process.

One preferred method which has been utilized in the practice of this invention comprises adding the desired amount of liquid trichlorodiphenyl to polypropylene in flake form and agitating the mixture with a domestic blender. An important advantage of this method is that the resulting powder is dry to the touch, free flowing, and essentially free from static electrical charge.

Unlike most prior processes of adding solvents or plasticizers to resins, the combination of trichlorodiphenyl and polypropylene does not result in a sticky mass or coagulated lumps. The powder obtained from a mix of about 100 mesh polypropylene and trichlorodiphenyl in a 14% by weight amount is sufficiently free flowing to be poured from a glass beaker with no significant remainder. The free flowing characteristics are those of a dry powder and not a wet mix.

A specific example of the production of preimpregnated polypropylene is as follows. Polypropylene in milled flake form of about 100 mesh powder and trichlorodiphenyl liquid were mixed together in a ratio of 100 grams of powder and 14 grams of trichlorodiphenyl. This mixture was placed in a domestic food blender and agitated or blended for about 30 seconds. The mixture was a very clean free flowing dust free powder. This powder was pressed into 18 mil sheets in a Carver hydraulic press with platens heated to about 210° C, with 100 seconds preheat. The material was subjected to a pressure of about 10,000 pounds per square inch (20 in $^2$) for about 50 seconds, then water quenched and removed from the press. The resultant film was uniform, dry, and bubble free.

Other films were produced from the above and similar powder mixes by passing through a film extruder. All films were subjected to dielectric tests and the film of this invention showed an increase in dielectric strength over a control sample not having trichlorodiphenyl therein.

The amount of trichlorodiphenyl which is added to polypropylene powder is significantly less than that which would tend to dissolve all the powder. A more important factor however is that the trichlorodiphenyl is being added at moderate or room temperatures where the solubility of polypropylene in trichlorodiphenyl is relatively low. Tests have indicated that film deterioration upon heating the preimpregnated film is negligible, and in some instances a preheating process was beneficial.

The polypropylene film of this invention may be produced from a number of film making apparatus ranging from pressing apparatus, extruding apparatus, to blown tube apparatus. It is desirable to provide suitable ventilation when elevated temperatures are involved in these apparatus to remove trichlorodiphenyl vapors which may become present.

These apparatus and related processes provide a preimpregnated film sheet having excellent structural integrity and electrical characteristics. These characteristics facilitate the handling and winding of strips suitable for capacitor use. As a dielectric material in electrical capacitors, it is preferred that the impregnated film of this invention be biaxially oriented and preferably balanced biaxially oriented.

The film produced by this invention may be employed in capacitors without further impregnation and may be in one or two or more sheet form. Where the film contains a maximum amount of trichlorodiphenyl subsequent heating at elevated temperatures near or above capacitor operating temperatures will cause some release of trichlorodiphenyl to further impregnate the voids or spaces between roll strips.

It has been found desirable to further impregnate some types of capacitors made by this invention in accordance with suitably modified impregnation practices previously utilized with unimpregnated film. For example, the capacitor roll section 19 of FIG. 2 is positioned in its respective casing 11 of FIG. 1 in the usual manner with a fill hole opened. In accordance with prior practices, the capacitor unit 10 is subjected to evacuation at elevated temperatures. With the preimpregnated polypropylene of this invention and the potential absence of paper with its inherent water vapor content, the evacuation time and temperature may be significantly reduced or eliminated. Trichlorodiphenyl is then introduced into casing 11 preferably by submerging the casing in trichlorodiphenyl at about 60° to 80° C. The hot trichlorodiphenyl rapidly progresses through the rolls in the casing for essentially complete impregnation. Preimpregnation minimizes the requirement of a large volume of trichlorodiphenyl because less trichlorodiphenyl is absorbed for each casing.

The presence of trichlorodiphenyl in the polypropylene cooperatively reacts to the hot trichlorodiphenyl so that passage of the trichlorodiphenyl through the roll is expedited. More particularly, it is believed that the presence of trichlorodiphenyl in the polypropylene creates certain predetermined and compatible paths therein which are easily followed by liquid impregnant. Accordingly, long soak times at elevated temperatures are not necessary.

Prior impregnation processes utilizing polypropylene and trichlorodiphenyl were found to cause appreciable swelling of the polypropylene. This swelling causes undue local pressures, limits impregnation and in some manner hinders uniform impregnation. It has been found that the preimpregnated film of this invention is also preswelled and no further significant swelling takes place upon further impregnation. It would be expected however that some proportional degree of swelling may take place upon further impregnation depending on the amount of trichlorodiphenyl preincorporated and the amount to be incorporated.

Maximum advantage of preimpregnation is obtained when the capacitor rolls of FIG. 1 are elongated, i.e., more than about 12 inches in the axial dimension, and are incorporated in the high voltage AC power capacitor as illustrated in FIG. 1. Impregnation of a long tightly wound roll without paper wicking is difficult. With preimpregnated film and follow-on liquid impregnation, trichlorodiphenyl penetrates to the center parts of the roll in minimal time.

Uniformity of impregnation or dispersal of the trichlorodiphenyl in polypropylene is an important feature of this invention. The blending or agitation is easily controlled as are most mixing processes, so that uniformity of the mixture is ascertained. This provided trichlorodiphenyl in the film at those locations where it is immediately required, particularly if no further liquid impregnation of the film is utilized. However, it may be that the liquid impregnation does not immediately penetrate all areas, and in this instance those areas will be served by the preimpregnation and prevent or minimize early failures. These critical areas would be expected to become more impregnated by the liquid impregnant due to ordinary aging.

In some capacitors the actual winding process may leave some intervening voids between strips and these voids must be filled, particularly for AC operation. In this instance a wicking sheet may be employed to draw the impregnant axially into the roll to fill these voids, much in the same sense as the comparable wicking sheets were employed in the noted Ruscetta patent. These voids may also be filled by the usual impregnation process where additional liquid impregnant is brought into contact with the roll edge. The preimpregnation provides a direct and expeditious path for the additional impregnant to flow into these voids. The overall advantage in preimpregnation is that further impregnation of the film per se is not necessary and even transverse passage through the film may not be necessary. In any event these two kinds of passage are greatly facilitated by the presence of trichlorodiphenyl in the film.

A further advantage of preimpregnation relates to the effective use of very high temperatures to aid in the impregnation or uniform dispersal. In the practice of this invention the film forming process generally includes extruding the resin where the extruder temperature is between about 170° to 250° C. This high temperature is advantageous to impregnation and is much higher than those near maximum temperatures employed for impregnation of film.

The impregnant is uniformly dispersed, or impregnably dispersed, in the polypropylene in an essentially continuous rather than discontinuous manner. For example, there are few, if any, discrete areas in the film which do not contain the impregnant.

The advantages of this invention are also obtained in other capacitors including those larger size capacitors employing plural roll sections. Included by way of example are low voltage AC capacitors, induction heating capacitors, and also DC capacitors. In DC capacitors where corona discharge is not a particularly serious problem, the preimpregnated film may suffice without further impregnation or with only a moderate amount of further impregnation liquid, time, and temperature.

Other smaller capacitors are extremely receptive to the practices of this invention because additional impregnation may be eliminated. These capacitors are generally denoted as small industrial type capacitors and some types are referred to as motor run capacitors, air conditioning capacitors, and ballast capacitors.

Figure 3:
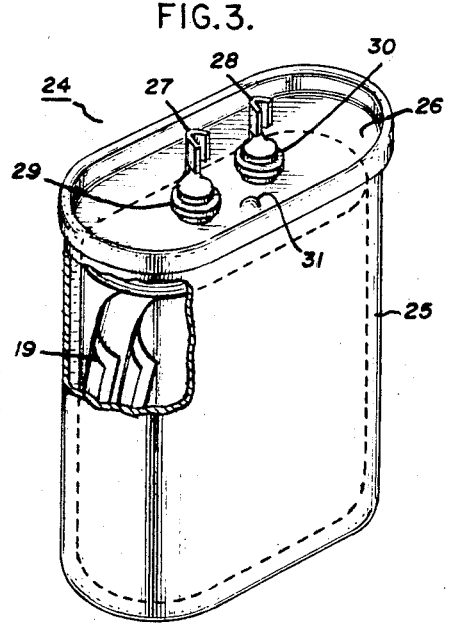
FIG. 3 is a modified capacitor utilizing a single roll of the kind illustrated in FIG. 2.

One embodiment of the mentioned capacitors is illustrated in FIG. 3. In FIG. 3, capacitor 24 comprises a can or casing 25 which houses a single roll 19 usually in a flattened configuration as shown in FIGS. 1 and 2. A cover member 26 is roll seamed to casing 25 and includes thereon terminal members 27 and 28. Those terminal members are electrically insulated from the cover by means of insulating grommets 29 and 30 and provide electrical connections to tap straps 17 and 18 of FIGS. 1 and 2. Cover 26 is usually provided with an aperture 31 for impregnation purposes which is solder sealed after impregnation.

Figure 4:
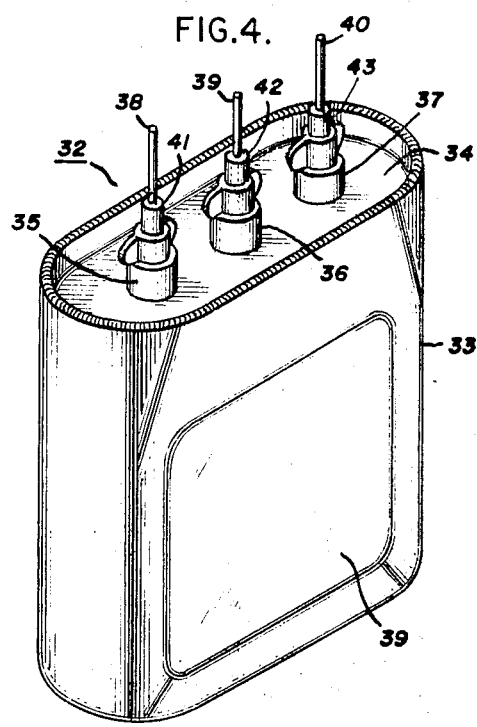
FIG. 4 is a ballast type capacitor which is a modification of the capacitor of FIG. 3.

A further example of a smaller type capacitor utilizing a single roll 19 is illustrated in FIG. 4. In FIG. 4, capacitor 32 is generally referred to as a ballast type capacitor and follows the general form of the capacitor 24 of FIG. 3. Capacitor 32 includes a casing 33 which houses roll 19, and a cover 34 which is welded to casing 33. Cover 34 includes upstanding nipples 35, 36, and 37 through which pass leads 38, 39, and 40 (for a dual capacitor roll) for electrical connection to the roll section 19. Silicone rubber sleeves 41, 42, and 43 are passed over leads 38, 39, and 40 and into nipples 35, 36, and 37. The capacitor is impregnated through the looseness in the sleeve-nipple-lead structure and thereafter the nipples are crimped about the sleeves for sealing purposes. Further details of construction of this kind of capacitor are found in U. S. Pat. No. 3,389,311, Rayno, assigned to the same assignee as the present invention.

Each of the capacitors of FIGS. 3 and 4 may employ a roll section 19 having one or more polypropylene strips therein. These strips are less than about 0.001 inch thick and multiple strips may be less than about 0.0005 inch thick. Usually the roll section 19 is relatively short in the axial direction and impregnation is therefore less difficult. With a preimpregnated film strip further impregnation is either unnecessary or greatly facilitated in these short rolls.

In the practice of this invention a number of halogenated aromatic liquid hydrocarbons may be employed, but most preferably, a chlorinated diphenyl liquid impregnant is employed. Suitable examples of a chlorinated diphenyl are commercially available under the trademarks Pyranol 1499 (General Electric Company) and Aroclor 1242 (Monsanto) which are essentially trichlorodiphenyl. In combination with chlorinated diphenyl, more optimum results are obtained when the resin material is principally polypropylene. However, other resins may be included with polypropylene as a mixture or a polyblend or a copolymer.

This invention is also applicable to other kinds of capacitors and capacitor embodiments. For example, polypropylene may be effectively employed in DC capacitors and other capacitor applications where different impregnants may be employed. Examples of these impregnants include mineral oil and castor oil. These materials are ordinarily not equivalents insofar as interaction effects with polypropylene are concerned or with respect to differing applications.

One of the advantages of preimpregnation of polypropylene with a chlorinated diphenyl is that swelling of the polypropylene is accommodated before roll winding takes place. Mineral oil is to some degree a solvent for polypropylene and has been found to cause swelling of polypropylene. Mineral oil has been added to polypropylene resin in accordance with the practice of this invention and film produced from this resin retains the preincorporated mineral oil effectively, compatibly, and with good handling characteristics.

Castor oil is ordinarily not a solvent for polypropylene and impregnation of polypropylene with castor oil is difficult. Such impregnation usually requires an elevated temperature and a longer period of impregnation time to provide the kind of complete impregnation desired. If higher temperatures were to be employed for impregnation to reduce the time required, for example about 200° C, the stability of the polypropylene would be affected, as may also be the stability of the combination after impregnation. By the practice of this invention, castor oil may be added to polypropylene resin at room temperature and the resulting film displays excellent capacitor grade film characteristics without any definitive adverse electrical or physical effects. Extruding the film from the resin at an extruder temperature between about 170° to 250° C provides a high temperature kind of impregnation during film formation. This process takes place at a higher temperature than could be utilized with the film itself. Both mineral oil and castor oil may be added in the same general amounts as indicated for chlorinated diphenyl. Mixtures of impregnants with other impregnants, thinners, etc., may also be employed, this invention being most applicable where the impregnants employed are principally those described, for example, principally chlorinated diphenyl, principally castor oil, and principally mineral oil.

This invention is primarily directed to capacitor dielectrics where great care must be exercised in the choice of materials placed in the electric field, and the purpose for their use. In a high voltage AC capacitor, for example a power factor correction capacitor operative at above about 600 volts, the polypropylene dielectric may be subjected to an electrical stress of about 1200 volts per mil thickness and at a temperature of about 80° to 100° C. Relatively low voltage capacitors such as motor run capacitors will have polypropylene stressed at least about 750 volts per mil thickness. The addition to this environment of a chlorinated diphenyl imposes severe limitations on other additives which might be employed because of unknown consequences. In other environments such as cable insulation or insulators generally, the operating principles are not similar, the stresses are minimal, and power factor is of little significance by comparison to capacitor operation. Consequently, the capacitor grade film of this invention is defined as a high stress film for operating long life stresses above about 750 volts per mill thickness, and of very small thickness of about 0.001 inch thick or less. This film is free from additives which would adversely affect these and other more common capacitor qualifications.

A further distinct advantage of the primpregnated film of this invention is that it facilitates the addition of certain epoxides directly into the film. The use of epoxides in capacitors as stabilizers therein is more fully described in U. S. Pat. No. 3,242,402, Stahr, assigned to the same assignee as the present invention. In the noted patent, epoxide is added to the trichlorodiphenyl and dissolves therein and the trichlorodiphenyl is then used to impregnate capacitors. For the purposes of the present invention, the noted trichlorodiphenyl with dissolved epoxide therein is added to finely divided polypropylene for preimpregnation as described in the same manner as described for trichlorodiphenyl alone. By this method epoxide is introduced into the film structure uniformly and is present in those areas requiring it at the same time those areas might become critical during the early stages of testing or operation. For example, this method does not require the epoxide to be carried throughout a capacitor roll section by the liquid impregnant during impregnation. Since there may be areas not reached immediately by the impregnation process, there may be critical areas causing failure of the capacitor if an epoxide was not otherwise present.

The amount of epoxide added may be varied over a wide range of concentrations, depending on the desired result, starting with smaller but significant amounts which indicate a measurable distinction by the presence of the epoxide. Suitable examples of preferred epoxides include 1-epoxyethyl-3,4-epoxy-cyclohexane known as Unox Epoxide 206; dipentene dioxide, known as Epoxide 269; dicyclo diepoxy carboxylates such as 3,4-epoxy-cyclohexylmethyl-3,4-epoxy-cyclohexanecarboxylate known as Unox 221; and 3,4-epoxy-6-methylcyclohexylmethyl-3,4-epoxy-6-methyl-cyclohexanecarboxylate known as Unox Epoxide 201. The foregoing materials are more fully described in U. S. Pat. Nos. 3,242,401; 3,242,402; 3,362,908; and 3,170,986, all of which are assigned to the same assignee as the present invention. Other epoxides include diglycidal ether of bisphenol A, known as DER 332, phenoxy propylene oxide having the group

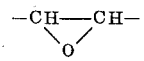

and epoxidized linseed oil known as Epoxyl-9-5.

By way of example, a suitable epoxide such as Unox 206 is added to the polypropylene to provide a desired concentration, which usually comprises between about 0.001 to 10 percent by weight of epoxide. Variable amounts of 0.1 to about 1.0 percent of Unox 206 have provided good results in capacitor embodiments. Other epoxides may be added in amounts which will provide equivalent epoxide groups.

Effective amounts of epoxide may be indicated by reaction rate and capabilities of the epoxides to neutralize HCl in the impregnant, as well as by increased life of a capacitor, for example, by the use of epoxides. The epoxide may be added directly to the resin before or after the addition of trichlorodiphenyl, as well as with it. It has been discovered that the epoxide may be added directly to the resin without adverse results to the resin or to the epoxide. Further, film produced from resin having only epoxide preincorporated therein displayed excellent stability and other characteristics of epoxide use together with increased effectiveness due to uniform distribution.

As one example, diglycidyl ether of bisphenol A only was added directly to polypropylene resin by incorporating the material in liquid form directly to polypropylene resin powder in a ratio of 1 part by weight epoxide to 100 parts by weight resin. Agitation of the polypropylene provided uniform distribution of the epoxide in the resin. Results indicate that better uniformity of distribution is achieved than by the conventional method of adding the epoxide to the impregnant and then impregnating the capacitor. This uniformity is essentially continuous in the film.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. A method of making a capacitor comprising in combination
   a. winding a capacitor roll section with alternate electrode and dielectric strips, at least one of said dielectric strips comprising a thin polypropylene film having uniformly incorporated therein essentially only liquid chlorodiphenyl in the amount of about 1–20 percent by weight of polypropylene
   b. assembly said roll section in a capacitor casing
   c. evacuating said casing
   d. filling said casing with liquid chlorodiphenyl to submerge said capacitor roll section
   e. sealing said casing f. and subjecting said casing to an elevated temperature to increase the liquid impregnant content and to obtain essentially complete impregnation of said roll section.

2. The invention as recited in claim 1 wherein said impregnant comprises trichlorodiphenyl.

3. The invention as recited in claim 1 wherein said film contains an epoxide stabilizer.

4. The invention as recited in claim 1 wherein said impregnation is carried out under vacuum conditions.

5. The invention as recited in claim 1 wherein said impregnation is carried out at elevated temperatures above about 80°C.

6. The invention as recited in claim 2 wherein said film is biaxially oriented.

7. The invention as recited in claim 2 wherein said incorporated impregnant contains an epoxide stabilizer.

8. The invention as recited in claim 4 wherein said film is less than about 0.001 inch thickness.

9. The invention as recited in claim 1 wherein said film constitutes the sole dielectric in said roll.

10. The invention as recited in claim 2 wherein said impregnant comprises substantially an equilibrium solution of said trichlorodiphenyl in said polypropylene.

11. A method of producing a capacitor comprising
a. adding liquid trichlorodiphenyl to finely divided polypropylene
b. vigorously agitating the materials to provide a uniform mixture
c. forming the mixture at temperatures at least about 170°C into a thin film
d. biaxially orienting said film
e. winding a capacitor roll section of two electrodes with said film
f. submerging said roll in liquid trichlorodiphenyl at elevated temperatures to increase the trichlorodiphenyl content thereof.

12. A method of making a capacitor roll section comprising
a. providing a pair of foil electrode strips with biaxially oriented polypropylene strip adjacent at least one of said electrode strips and a porous material adjacent said polypropylene strip
b. said polypropylene strip being a relatively dry strip containing trichlorodiphenyl in an amount between about 1 to 20 percent by weight of polypropylene
c. winding said strip into a capacitor roll section subjecting said roll section to evacuation
d. and impregnating said roll section by submerging it in liquid trichlorodiphenyl at elevated temperatures to increase the trichlorodiphenyl content thereof.

13. A method of making a capacitor comprising in combination
a. winding a capacitor roll section of two electrodes with a biaxially oriented polypropylene film having impregnated therein a chlorodiphenyl in an amount between about 1% and 20% by weight of polypropylene
b. inserting said roll section in a capacitor casing
c. evacuating the casing
d. filling said casing with liquid chlorodiphenyl to submerge and impregnate said capacitor roll section and increase the chlorodiphenyl content thereof
e. and sealing said casing.

* * * * *